United States Patent

Geissler et al.

(12) United States Patent
(10) Patent No.: US 11,218,533 B2
(45) Date of Patent: Jan. 4, 2022

(54) METHOD FOR OPERATING A WEB SERVER

(71) Applicant: Siemens Aktiengesellschaft, Munich (DE)

(72) Inventors: Klaus Geissler, Baden-Baden (DE); Ralf Klose, Altdorf (DE); Ralf Mildenberger, Schutterwald (DE); Sergej Kuznetsov, Hagenbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/560,234

(22) Filed: Sep. 4, 2019

(65) Prior Publication Data

US 2020/0076870 A1 Mar. 5, 2020

(30) Foreign Application Priority Data

Sep. 5, 2018 (EP) .................................... 18192700

(51) Int. Cl.
  *G06F 15/16* (2006.01)
  *H04L 29/08* (2006.01)
  *H04L 29/06* (2006.01)

(52) U.S. Cl.
  CPC .............. *H04L 67/02* (2013.01); *H04L 63/10* (2013.01); *H04L 63/12* (2013.01); *H04L 67/06* (2013.01)

(58) Field of Classification Search
  CPC .... G06F 21/126; G06F 21/128; G06F 21/335; G06F 21/6281; G06F 9/468; G06F 9/4843; G06F 9/545; H04L 63/10; H04L 63/101; H04L 63/12; H04L 67/02; H04L 67/06; H04L 67/125; H04L 67/42
  See application file for complete search history.

(56) References Cited

U.S. PATENT DOCUMENTS

| | | | | |
|---|---|---|---|---|
| 5,903,732 | A | * | 5/1999 | Reed ...................... H04L 67/02 709/229 |
| 6,523,027 | B1 | * | 2/2003 | Underwood ............ G06F 9/465 |
| 6,601,233 | B1 | * | 7/2003 | Underwood .............. G06F 8/24 717/100 |

(Continued)

FOREIGN PATENT DOCUMENTS

DE     102005045944     4/2006

*Primary Examiner* — Moustafa M Meky
*Assistant Examiner* — Thorne E Waugh
(74) *Attorney, Agent, or Firm* — Cozen O'Connor

(57) ABSTRACT

A method for operating a web server implemented on a computer, wherein in a launch phase, a web server process ignores requests from clients and a further process having elevated permissions of the web server process is started by the web server process, where the further process serves to execute actions with access to a predefined operating system area, following the launch phase, the web server process transitions to normal operation such that when the web server process then receives a request requiring an action with access to the predefined operating system area, the permissibility of the received request is checked by the web server process and in the event of a permissible request, the web server process and the further process communicate, which prompts the further process to execute the action with the required access to the predefined operating system area.

15 Claims, 3 Drawing Sheets

(56) References Cited

U.S. PATENT DOCUMENTS

| | | | |
|---|---|---|---|
| 6,704,873 B1* | 3/2004 | Underwood | H04L 63/02 709/223 |
| 6,801,949 B1* | 10/2004 | Bruck | H04L 29/12009 709/232 |
| 7,546,576 B2* | 6/2009 | Egli | H04L 29/06 715/239 |
| 7,881,715 B2* | 2/2011 | Kirani | H04L 67/1095 455/426.1 |
| 8,447,829 B1 | 5/2013 | Geller et al. | |
| 9,246,773 B2* | 1/2016 | Degioanni | H04L 41/22 |
| 9,716,740 B2* | 7/2017 | Fausak | H04L 67/40 |
| 10,678,805 B2* | 6/2020 | Chen | G06F 16/248 |
| 10,880,292 B2* | 12/2020 | Koottayi | H04L 67/141 |
| 2004/0117460 A1* | 6/2004 | Walsh | H04L 41/145 709/219 |
| 2004/0237082 A1* | 11/2004 | Alcazar | G06F 9/44521 717/174 |
| 2006/0089967 A1 | 4/2006 | Gutmans et al. | |
| 2007/0156897 A1* | 7/2007 | Lim | H04L 63/20 709/225 |
| 2008/0301766 A1* | 12/2008 | Makino | G06F 21/51 726/1 |
| 2015/0096010 A1* | 4/2015 | Pollutro | H04L 63/067 726/13 |
| 2016/0105350 A1* | 4/2016 | Greifeneder | H04L 41/12 709/224 |

\* cited by examiner

METHOD FOR OPERATING A WEB SERVER

BACKGROUND OF THE INVENTION

1. Field of the Invention

The invention relates to a computer program product, a computer program, a method for operating a web server and to a computer having a web server implemented thereon.

2. Description of the Related Art

The use of what are known as web servers that are implemented on computers and that allow communication with clients is known. One advantage of this web server-based communication is that it is independent of the operating system of the clients and the computer upon which the web server is running.

In the meantime, web servers are used in a multiplicity of fields of application in order to access computers via clients. Here, access is generally achieved via a browser that is provided on the client. Web servers are implemented, for example, on control computers of an automation facility to allow clients to access the control computers.

In the framework of web server-based communication, the client sends requests to the web server, which processes these requests to execute actions specified in the requests. Web server-based communication in this case has the disadvantage that the requests allow only restricted access to the computer upon which the web server is implemented. In particular, requests may not trigger any actions that allow access to protected operating system areas. Web server-based communication is therefore not suitable for performing administrative tasks, such as maintaining a computer or installing or updating software on a computer.

Although it is technically possible to start a web server process with elevated permissions in order to also allow administrative tasks to be performed, this constitutes a very high security risk because the elevated permissions of the web server entail the risk of unauthorized third parties manipulating protected operating system areas.

SUMMARY OF THE INVENTION

In view of the foregoing, it is therefore an object of the invention to provide a method for operating a web server that has elevated access permissions and is at the same time well protected against unauthorized attacks.

This and other objects and advantages are achieved in accordance with the invention by a method that serves to operate a web server that is implemented on a computer having an operating system running thereon. Here, the web server is configured, in a manner known per se, so as to execute a web server process using a web application in order to process requests from clients. The web server process, during normal operation of the web server, is executed with permissions that rule out access (i.e., to read and write access) to a predefined operating system area of the computer (i.e., not permit it). In other words, it is not permissible either to read from or to write to the predefined operating system area. The predefined operating system area is thus a protected memory area of the operating system that may be defined differently depending on the design. This is generally an area in which unauthorized manipulations by attackers may lead to serious damage in the operating system or on the computer.

In the context of the method in accordance with the invention, after the web server is started, a launch phase is initially run through in which the web server process is executed with elevated permissions that, in addition to the permissions during normal operation, allow access to the predefined operating system area of the computer. Since there is an increased security risk in this launch phase, (all of the) requests from clients are ignored by the web server process in this launch phase. The web server process furthermore starts a further process having the elevated permissions of the web server process in this launch phase, where the further process is intended to execute actions with access to the predefined operating system area.

Following the launch phase, preferably immediately after the further process has started, the web server process transitions to normal operation, i.e., to operation that does not permit the web server process to access the predefined operating system area. If, during normal operation, the web server process then receives a request that requires an action with access to the predefined operating system area, then the permissibility of the received request is checked by the web server process. Here, in the event of a permissible request, the web server process and the further process communicate, which prompts the further process to execute the action with the required access to the predefined operating system area in accordance with the received request. If the request is impermissible, then this communication does not occur and the request is discarded by the web server process.

The method in accordance with the invention has the advantage that, by initializing a further process with elevated permissions via a web server process, the possibility of accessing protected operating system areas is provided. Here, it is ensured at all times that the web server process itself is not accessing protected operating system areas. This is achieved in a launch phase by the web server process still being started with elevated permissions, but all requests from clients being ignored thereby in this phase.

In one particularly preferred embodiment of the method in accordance with the invention, the web server is addressed by a remote client. Here, the requests originate from the web servers of clients that are implemented on a computer different from the computer upon which the web server is implemented.

In a further preferred embodiment, the elevated permissions, in contrast to the non-elevated permissions of the web server process, permit the installation of software on the computer on which the web server is implemented.

Depending on the embodiment of the method in accordance with the invention, requests may be ignored in the context of the launch phase in different ways. In one embodiment, the web server process ignores the requests by keeping a port that is provided for communication with clients closed. This port is opened only during normal operation of the web server.

In a further embodiment of the invention, a port that is provided for communication with the clients is already open during the launch phase. The web server process ignores requests such that the requests, although they are received by the web server process, are however subsequently dismissed (i.e., not processed).

The check on the permissibility of requests that entail access to the predefined operating system area may be defined differently depending on the embodiment of the invention. In one preferred embodiment, the sender of the request is identified, in the context of the check on the permissibility of a received request, based on information in the received request. By way of example, the information may directly represent the corresponding sender identification. Here, the term sender should be understood broadly. It is preferably the identification of a user who generates the request to the corresponding client. In the context of this embodiment of the invention, one required condition for the permissibility of the request is that the identified sender is recognized by the web server process as a sender from a number of authorized senders. Administrative tasks can thereby be restricted to certain senders.

In a further embodiment of the method in accordance with the invention, a received request comprises a digital signature, where the signature is verified in the context of the check on the permissibility of the received request. One required condition for the permissibility of the request is in this case that the signature is able to be verified successfully. This embodiment of the invention is preferably combined with the embodiment described above, according to which a check is performed to determine whether the sender of the request is an authorized sender. In other words, it is necessary for the permissibility of the request in this case for firstly the digital signature of the request to be able to be verified successfully and secondly for the sender to be able to be recognized as an authorized sender.

In a further preferred embodiment of the method in accordance with the invention, the requests from the clients are each generated in a manner known per se by a user via a browser running on the corresponding client and that interacts with the web application.

The method in accordance with the invention may be used in any desired technical fields. One preferred field of application is communication with computers in an automation facility. An automation facility in this case serves to perform tasks automatically. It may in particular be a manufacturing or production facility, and possibly also a logistics facility. In the case of using the invention in such an automation facility, the computer on which the web server is implemented is a control computer in the automation facility.

It is also an object of the invention to provide a computer upon which a web server is implemented and upon which an operating system is installed, where the web server is configured to execute a web server process using a web application to process requests from clients. The web server process, during normal operation of the web server, is in this case, executed with permissions that rule out access to a predefined operating system area of the computer. The web server of this computer in accordance with the invention is configured so as to perform the method according to the invention or one or more preferred embodiments of the method in accordance with the invention.

It is also an object of the invention to provide a non-transitory computer-readable medium (computer program product) having a program code, stored on a machine-readable carrier, for performing the method in accordance with the invention or one or more preferred embodiment of the method in accordance with the invention when the program code is executed on a computer. This computer program product thus comprises a machine-readable carrier containing software by way of which the web server described above is implemented.

It is also an object of the invention to provide a computer program having a program code for performing the method in accordance with the invention or one or more preferred embodiments of the method in accordance with the invention when the program code is executed on a computer. This computer program thus relates to software by way of which the web server described above is implemented.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the invention is described in detail below with reference to the attached figures, in which.

DETAILED DESCRIPTION OF THE EXEMPLARY EMBODIMENTS

Figure 1:
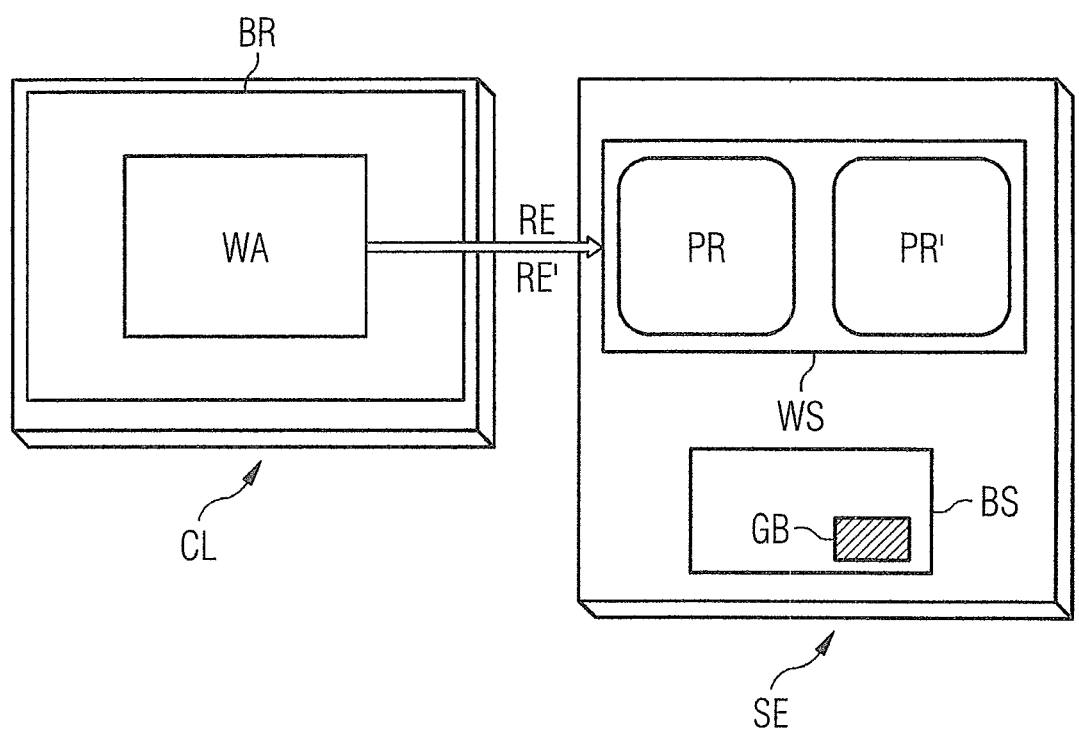
FIG. 1 shows a schematic illustration of a client-server architecture that comprises a web server that is operated based on one embodiment of the method in accordance with the invention.

According to FIG. 1, a web server WS that can interact with a client CL is implemented on a schematically illustrated computer in the form of a server SE. In the exemplary embodiment described here, the client in this case runs on a device that is not the server SE, such as on another computer, a smartphone, or a tablet. In addition to the web server WS, the server SE comprises an operating system BS running thereon and that comprises a protected area GB that cannot be accessed during normal operation of the web server WS. The protected area is a memory area of the operating system that may possibly be divided into a plurality of separate memory sections.

In one exemplary application, the server SE is a control computer of an automation facility, such as the control computer for a particular component of the automation facility. The aim in this case is for a user, via the client CL, to be able to give commands to the web server in order to operate the control computer during normal operation of the automation facility, and additionally to provide the possibility for authorized users to be able to initiate administrative procedures, such as the installation of software, on the server SE via the client CL. Such administrative access operations cannot normally be performed by a client communicating with a web server.

According to FIG. 1, a user (not shown) on the client CL communicates with the web server WS via a browser BR, a web application WA being used for this purpose. In the context of this communication, the client sends requests RE generated by the user to the web server WS, which processes these requests during normal operation. For this purpose, the web server WS executes a web server process PR using the web application WA. It is then essential to the invention that a further child process PR' is additionally executed in addition to the web server process PR in the web server WS. This process PR' may execute actions based on special requests RE' from the client CL, and do so based on requests for which access to the protected area GB of the operating system BS is necessary. In other words, the child process PR' serves to execute administrative tasks that are based on special requests RE'. These requests may not be executed by the web server process PR.

Figure 2:
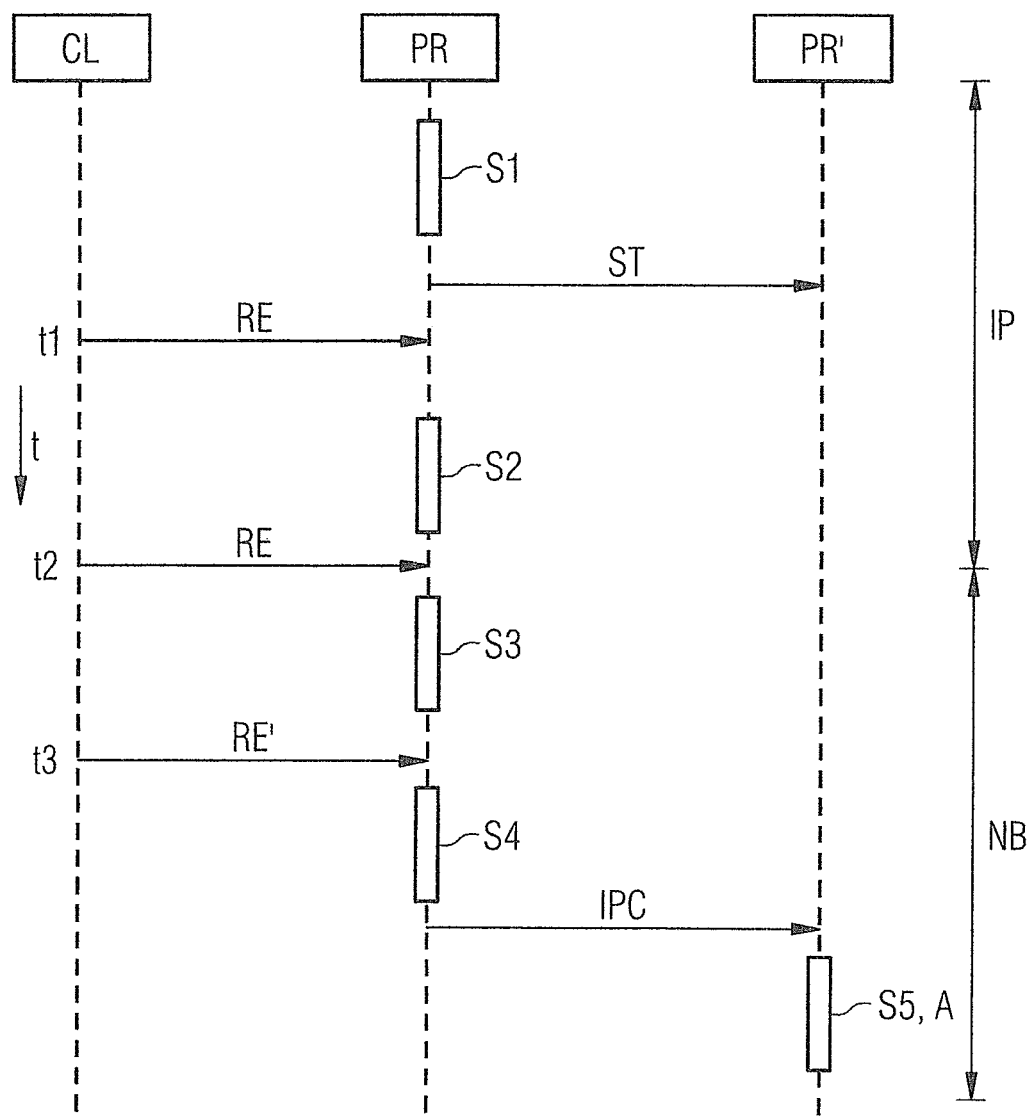
FIG. 2 shows a flow diagram that explains one embodiment of the method in accordance with the invention for operating a web server.

FIG. 2 shows the interaction of the components shown in FIG. 1 in the context of one embodiment of the method in accordance with the invention, based on a timing chart. In this chart, the time t from the starting of the web server is depicted going down in the vertical direction. Furthermore, the components involved in the communication are indicated schematically by the reference signs CL (client), PR (web server process) and PR' (child process) and correspondingly associated vertical lines.

At the beginning of the method, after the web server WS is started, a launch or initialization phase is initially run through, this being denoted IP in FIG. 2. Only thereafter is there a transition to normal operation of the web server, this being denoted NB in FIG. 2. According to FIG. 2, the web server process PR is started in step S1. In this case, the process PR is however not executed with conventional permissions, but rather with elevated permissions that allow access to the protected area GB of the operating system BS from FIG. 1. The web server process PR running with elevated permissions then starts, according to the arrow ST in FIG. 2, the child process PR' already mentioned above, where this child process PR' has the same permissions as the web server process PR, i.e., the child process is initiated with the same elevated permissions as the web server process. Here, the child process PR' serves to execute administrative actions on the server SE that require access to the protected area GB of the operating system BS.

Due to the web server process PR starting with elevated permissions, there is a security risk caused by unauthorized requests that aim to manipulate protected areas of the operating system. To eliminate this security risk, the port of the web server to clients is not yet opened in the launch phase IP. All requests in the time interval of the launch phase IP are consequently ignored. According to FIG. 2, a request RE from the client CL to the web server or the web server process PR is sent, for example, at the time t1. This request is, however, not processed due to the closed port. In a modified embodiment, there is also the possibility of the port already being opened in the launch phase IP, where in this case corresponding requests are still received by the web server process PR, but are not further processed and, in this sense, are dismissed.

After the child process PR' has been started, the web server process PR' downgrades itself according to step S2 in FIG. 2, i.e., the web server process PR' transitions to normal operation in which it can only process requests from the client CL that do not require access to the protected area GB of the operating system BS. FIG. 2 illustrates such a request RE that is sent by the client CL to the web server process at the time t2. This request is processed by the web server process according to step S3 shown in FIG. 2.

By virtue of starting the child process PR', it is now also possible during normal operation NB to process requests RE' according to which actions need to be performed on the server SE that require access to the protected area GB of the operating system BS. Such a request RE' is depicted at the time t3. According to step S4, the web server process PR checks whether this request is permissible. In this case, an identification of the sender of the request and a digital signature of the sender are also transmitted by way of the request RE'. The sender corresponds to the user who is currently communicating with the web server WS via the browser BR.

The web server process PR stores the users who have administrator permissions. In step S4, it is accordingly checked whether the sender of the message RE' is a user having administrator permissions. The signature is furthermore verified. The request is classified as permissible and the method is continued by an interprocess communication IPC, known per se, between the web server process PR and the child process PR' only in the event that the user has administrator permissions and the digital signature of the request RE' is able to be verified successfully. This communication triggers step S5 shown in FIG. 2, which in turn executes an action A for which access to protected areas of the operating system BS of the server SE is necessary. Such an action may be for example the installation of software in the context of maintenance of the server SE.

The embodiment, described above, of the invention has a number of advantages. Web server-based communication between a client and a server, by way of which administrative processes can be performed on the server, is in particular made possible, this not normally being possible in the case of web server-based communication. The communication, by virtue of using the web server is, in this case independent of the operating system of the client and of the server, and does not require any special administration tools to be installed on the part of the client. Sufficient security of the method is furthermore ensured by virtue of the fact that, in a launch phase in which the web server process is executed with elevated permissions, no requests are initially processed by the web server after the web server is started with elevated permissions.

Figure 3:
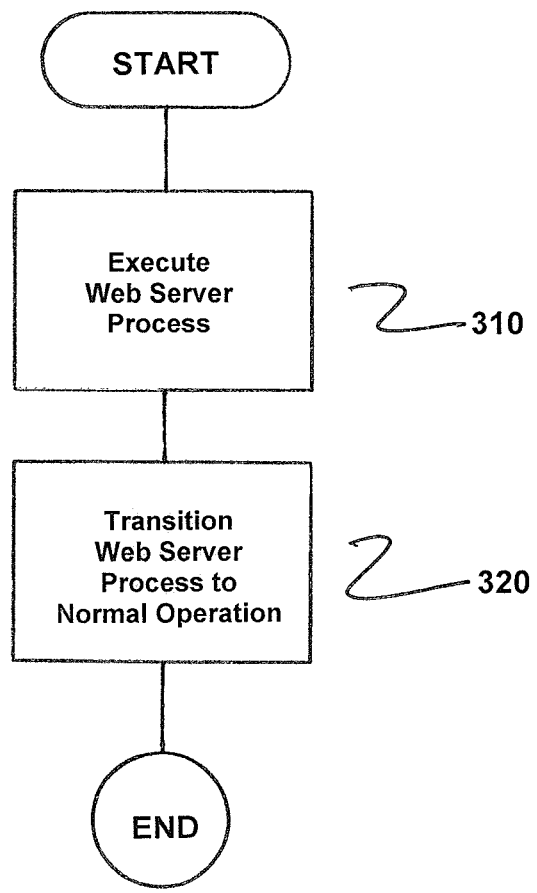
FIG. 3 is a flowchart of the method in accordance with the invention.

FIG. 3 is a flowchart of the method for operating a web server WS implemented on a computer SE having an operating system BS executing thereon, where the web server WS is configured to execute a web server process PR utilizing a web application WA to process requests RE, RE' from clients CL, and where the web server process PR, during normal operation NB of the web server WS, is executed with permissions which rule out access to a predefined operating system area GB of the computer SE.

The method comprises executing the web server process PR with elevated permissions, during a launch phase IP of the web server WS after starting the web server WS which, in addition to the permissions during normal operation NB, allow access to the predefined operating system area GB of the computer SE, as indicated in step 310. In accordance with the invention, during the launch phase IP the web server process PR ignores requests RE, RE' from clients CL and a further process PR' having the elevated permissions of the web server process PR is started by the web server process PR, and the further process PR' serves to execute actions A with access to the predefined operating system area GB.

Next, the web server process PR is transitioned to normal operation NB to process requests RE, RE' from clients CL subsequent to the launch phase IP, as indicated in step 320.

In accordance with the invention, in an event of the web server process PR receiving a request RE' requiring an action A with access to the predefined operating system area GB, a permissibility of the received request RE' is checked by the web server process PR, and the web server process PR and the further process PR' communicate IPC, which prompts the further process PR' to execute the action A with the required access to the predefined operating system area GB in accordance with the received request RE' in an event of a permissible request.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a web server implemented on a computer having an operating system executing thereon, the web server being configured to execute a web server process utilizing a web application to process requests from clients, and the web server process, during normal operation of the web server, being executed with permissions which rule out access to a predefined operating system area of the computer, the method comprising:

executing the web server process with elevated permissions, during a startup phase of the web server which commences after the web server is initiated which, in addition to the permissions allowed when the web server is fully operational, allow access to the predefined operating system area of the computer, requests from clients being ignored by the web server process within a predetermined time period comprising the startup phase of the web server and a further process having the elevated permissions of the web server process being started by the web server process, and the further process serving to execute actions with access to the predefined operating system area; and transitioning the web server process to normal operation to process requests from clients subsequent to the launch phase, in an event of the web server process receiving a request requiring an action with access to the predefined operating system area, a permissibility of the received request being checked by the web server process, and the web server process and the further process communicating, which prompts the further process to execute the action with the required access to the predefined operating system area in accordance with the received request in an event of a permissible request.

2. The method as claimed in claim 1, wherein the requests originate from clients which are implemented on a computer different from the computer upon which the web server is implemented.

3. The method as claimed in claim 2, wherein the elevated permissions, in contrast to non-elevated permissions of the web server process, permit installation of software on the computer upon which the web server is implemented.

4. The method as claimed in claim 2, wherein the web server process ignores the requests in the launch phase by keeping a port that is provided for communication with clients closed, said port being open during normal operation.

5. The method as claimed in claim 1, wherein the elevated permissions, in contrast to non-elevated permissions of the web server process, permit installation of software on the computer upon which the web server is implemented.

6. The method as claimed in claim 5, wherein the web server process ignores the requests in the launch phase by keeping a port that is provided for communication with clients closed, said port being open during normal operation.

7. The method as claimed in claim 1, wherein the web server process ignores the requests in the launch phase by keeping a port that is provided for communication with clients closed, said port being open during normal operation.

8. The method as claimed in claim 1, wherein, in the launch phase, a port provided for communication with clients is open and the web server process ignores the requests by dismissing said requests.

9. The method as claimed in claim 1, wherein a sender of the request is identified, in contexts of the check on the permissibility of the received request, based on information in the received request; and wherein a required condition for the permissibility of the request comprises recognizing, by the web server process, the identified sender as a sender from a plurality of authorized senders.

10. The method as claimed in claim 1, wherein the received request comprises a digital signature; wherein the signature is verified in contexts of the check on the permissibility of the received request; and wherein one required condition for the permissibility of the request is an ability to successfully verify the signature.

11. The method as claimed in claim 1, wherein the requests from the clients are each generated by a user via a browser executing on a corresponding client and which interacts with the web application.

12. The method as claimed in claim 1, wherein the computer upon which the web server is implemented comprises a control computer in an automation facility.

13. A computer upon which a web server is implemented and on which an operating system is installed, the web server being configured to execute a web server process utilizing a web application to process requests from clients, the web server process being executed with permissions which rule out access to a predefined operating system area of the computer during normal operation of the web server, and the web server being configured to:

executing the web server process with elevated permissions during a startup phase of the web server which commences after the web server is initiated which, in addition to the permissions allowed when the server is fully operational, allow access to the predefined operating system area of the computer, requests from clients being ignored by the web server process within a predetermined time period comprising the startup phase of the web server and a further process having the elevated permissions of the web server process via the web server process during the launch phase, and the further process serving to execute actions with access to the predefined operating system area; and transitioning the web server process transitions to normal operation to process requests from clients subsequent to the launch phase, in an event of the web server process receiving a request requiring an action with access to the predefined operating system area, a permissibility of the received request being checked by the web server process, and the web server process and the further process communicating, which prompts the further process to execute the action with the required access to the predefined operating system area in accordance with the received request in an event of a permissible request.

14. The computer as claimed in claim 13, wherein the web server of the computer is configured so as to perform a method for operating the web server implemented on the computer having the operating system.

15. A non-transitory computer program product having a program code stored on a machine-readable carrier which, when executed on a computer, causes operation of a web server implemented on the computer having an operating system, the program code comprising:
- program code for executing the web server process with elevated permissions, during a startup phase of the web server which commences after the web server is initiated which, in addition to the permissions allowed when the web server is fully operational, allow access to the predefined operating system area of the computer, requests from clients being ignored by the web server process within a predetermined time period comprising the startup phase of the web server and a further process having the elevated permissions of the web server process being started by the web server process, and the further process serving to execute actions with access to the predefined operating system area; and
- program code for transitioning the web server process to normal operation to process requests from clients subsequent to the launch phase, in an event of the web server process receiving a request requiring an action with access to the predefined operating system area, a permissibility of the received request being checked by the web server process, and the web server process and the further process communicating, which prompts the further process to execute the action with the required access to the predefined operating system area in accordance with the received request in an event of a permissible request.

* * * * *